United States Patent
Su et al.

(10) Patent No.: US 11,566,965 B2
(45) Date of Patent: Jan. 31, 2023

(54) CONTACT LENS RETRIEVING METHOD

(71) Applicant: HOPE VISION CO., LTD., Miaoli County (TW)

(72) Inventors: Zheng Jun Su, Hsinchu County (TW); Hsiu Ming Yang, Hsinchu (TW); Huan Chiu Tsen, Hsinchu (TW)

(73) Assignee: Hope Vision Co., Ltd., Miaoli County (TW)

( * ) Notice: Subject to any disclaimer, the term of this patent is extended or adjusted under 35 U.S.C. 154(b) by 180 days.

(21) Appl. No.: 17/220,296

(22) Filed: Apr. 1, 2021

(65) Prior Publication Data
US 2022/0244135 A1    Aug. 4, 2022

(30) Foreign Application Priority Data

Feb. 3, 2021   (TW) ................................ 110103914

(51) Int. Cl.
*G01M 11/02* (2006.01)
*B65G 49/06* (2006.01)

(52) U.S. Cl.
CPC ....... *G01M 11/0214* (2013.01); *B65G 49/061* (2013.01); *G01M 11/0278* (2013.01)

(58) Field of Classification Search
CPC ............ B65G 49/061; G01M 11/0214; G01M 11/0278
See application file for complete search history.

(56) References Cited

U.S. PATENT DOCUMENTS 4,738,530 A * 4/1988 Ryder ................ G01M 11/0214
356/124

FOREIGN PATENT DOCUMENTS

TW            I696824 B      6/2020

* cited by examiner

*Primary Examiner* — Dominic J Bologna
*Assistant Examiner* — Amanda Merlino
(74) *Attorney, Agent, or Firm* — Rosenberg, Klein & Lee

(57) ABSTRACT

A contact lens retrieving method is applied to a contact lens, which is placed in a detection container containing a buffer solution and has been inspected in an optical detection. The method comprises steps:
moving a vacuum sucker into the buffer solution at a first speed to make the contact lens depart from the lateral side of the detection container; moving the vacuum sucker away from a bottom of the detection container at a second speed with the vacuum sucker not leaving the buffer solution to make the contact lens flow toward a center of the detection container;
moving the vacuum sucker to approach the contact lens at a third speed to make the vacuum sucker and the contact lens positioned to each other; and using the vacuum sucker to take up the contact lens and carry the contact lens out of the detection container.

8 Claims, 6 Drawing Sheets

CONTACT LENS RETRIEVING METHOD

This application claims priority of Application No. 110103914 filed in Taiwan on 3 Feb. 2021 under 35 U.S.C. § 119;the entire contents of all of which are hereby incorporated by reference.

BACKGROUND OF THE INVENTION

Field of the Invention

The present invention relates to a contact lens fabrication technology, particularly to a contact lens retrieving method.

Description of the Prior Art

The contact lenses can replace ordinary eyeglasses to overcome problems of vision. Therefore, the contact lens is a popular option for the persons suffering from visual degradation, such as myopia. The contact lens with a colored annularity around the optical area has become an essential fashion accessory in many countries and thus assumes the position of fashion statement. Some types of contact lenses not only can correct vision but also can present a special style of the users.

The fabrication process of contact lenses includes steps of machining, casting, spin-coating, thermal curing/UV curing, etc. After contact lenses are completed, the defects, such as burrs, notches, speckles, scratches, etc., on the surfaces thereof need treating and examining. Before examination, a transfer device is used to transfer a contact lens to a liquid-containing detection container. However, the contact lens is often unlikely to be centered in the abovementioned process. Such a problem seriously affects the results of automated optical inspection (AOI). After examination, the transfer device is used to retrieve the contact lens in the liquid-containing detection container. If the contact lens is not centered, the retrieving process will be affected, and the examination process will be delayed. In the conventional technologies, the contact lens is centered manually; alternatively, the liquid flow is controlled to change the position of the contact lens. Please refer to a Taiwan patent No. I696824. In the prior art, an angled nozzle injects a buffer solution to generate an eddy and center the contact lens. However, this prior art may generate bubbles and thus fail to center the contact lens.

SUMMARY OF THE INVENTION

One objective of the present invention is to provide a contact lens retrieving method, wherein after the optical detection of a contact lens, which is undertaken in a detection container containing a buffer solution, is completed, the flow of the buffer solution is controlled step by step to facilitate the positioning of the contact lens, whereby the efficiency of retrieving the contact lenses is greatly improve, wherefore the time and cost of detecting contact lenses is significantly reduced.

In order to achieve the abovementioned objective, the present invention proposes a contact lens retrieving method. The contact lens is placed in a detection container containing a buffer solution. The method comprises steps: moving a vacuum sucker into the buffer solution at a first speed to make the contact lens depart from the lateral side of the detection container; moving the vacuum sucker away from the bottom of the detection container at a second speed with the vacuum sucker not leaving the buffer solution to make the contact lens flow to the center of the detection container; moving the vacuum sucker at a third speed to approach the contact lens to make the vacuum sucker and the contact lens positioned to each other; using the vacuum sucker to take up the contact lens and carry the contact lens out of the detection container to complete the contact lens retrieving process.

In one embodiment, the first speed is smaller than the second speed.

In one embodiment, the third speed is smaller than the first speed.

In one embodiment, the vacuum sucker includes a pusher. The pusher is disposed along the perimeter of the vacuum sucker and may move back and forth with respect to the vacuum sucker.

In one embodiment, the vacuum sucker further includes a limiting device. The limiting device is disposed along a perimeter of the pusher and protrudes to the front end of the pusher.

In one embodiment, the detection container has an arc-shaped inner bottom surface.

In one embodiment, the detection container has an oblique inner lateral surface.

In one embodiment, a front end of the vacuum sucker has an arc-shaped surface, and the arc-shaped surface has a plurality of air-sucking holes.

In comparison with the conventional technologies, the present invention is exempted from adjusting and positioning the contact lens manually and thus can effectively save manpower. Further, the step-by-step control of the flow of the buffer solution not only make the centering process of the contact lens easier to operate but also make the centering process of the contact lens more likely to succeed. Furthermore, the present invention can decrease the generated bubbles, increase the efficiency of retrieving the contact lens, and decrease the time and cost of detecting contact lenses.

Below, embodiments are described in detail to make easily understood the objectives, technical contents, characteristics and accomplishments of the present invention.

DETAILED DESCRIPTION OF THE INVENTION

Figure 1:
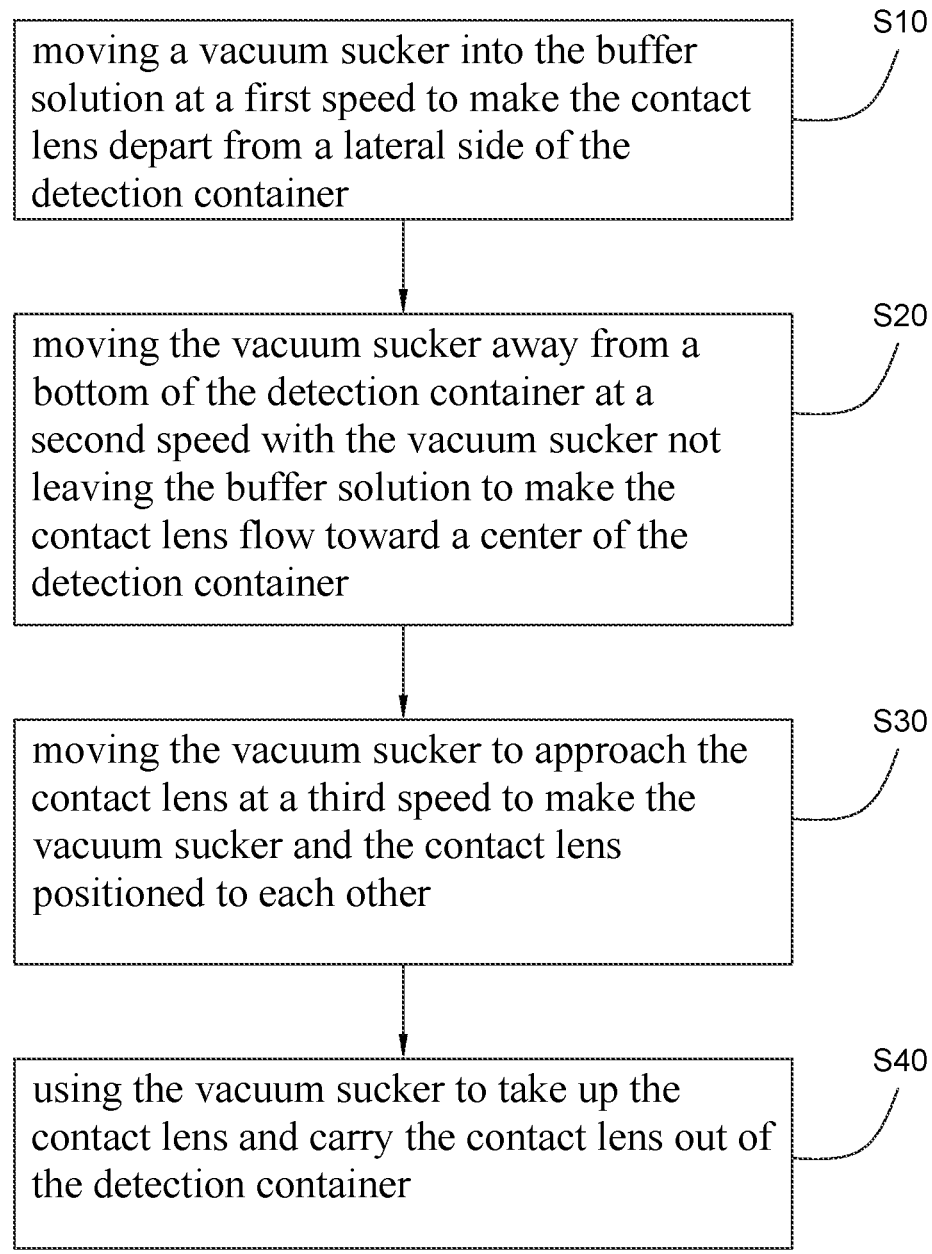
FIG. 1 is a flowchart of a contact lens retrieving method according to one embodiment of the present invention.

Refer to FIG. 1, which shows a flowchart of a contact lens retrieving method according to one embodiment of the present invention. Refer to FIGS. 2A-2E, which are sectional views schematically showing the steps of a contact lens retrieving method in sequence according to one embodiment of the present invention. The steps of the method of the present invention are described below.

Figure 2A:
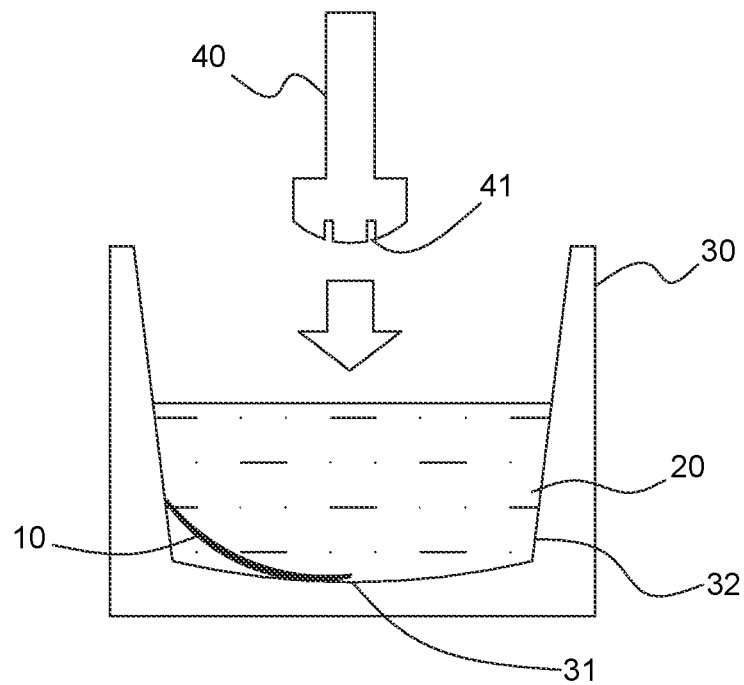
FIGS. 2A-2E are sectional views schematically showing the steps of a contact lens retrieving method according to one embodiment of the present invention.
Figure 2B:
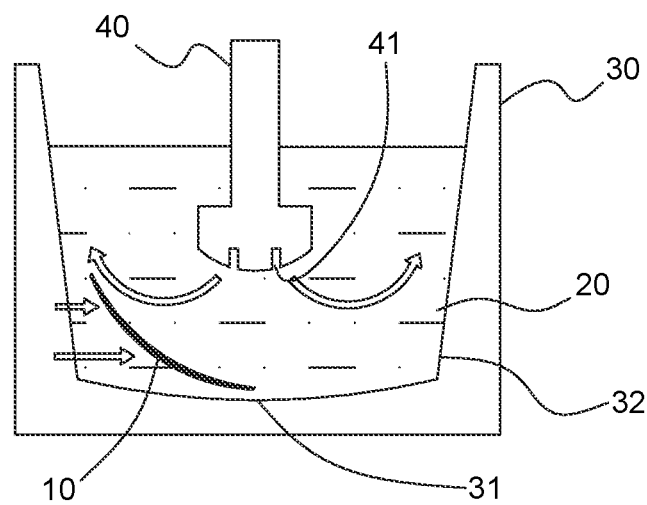

Before the retrieving process, a contact lens 10 is placed in a detection container 30 for detection. The detection container 30 contains a buffer solution 20. The buffer solution 20 may be deionized water. After an optical detection is completed, the contact lens 10 normally sinks to the underneath of the buffer solution 20, as shown in FIG. 2A. In a step S10, a vacuum sucker 40 is moved toward the detection container 30 at a first speed, and the vacuum sucker 40 is submerged into the buffer solution 20, as shown in FIG. 2B. After the vacuum sucker 40 breaks into the surface of the buffer solution 20, the buffer solution 20 flows to form eddies, whereby the contact lens 10 moves to slightly depart from the lateral surface 32 of the detection container 30 and create a lateral space of the contact lens 10.

Figure 2C:
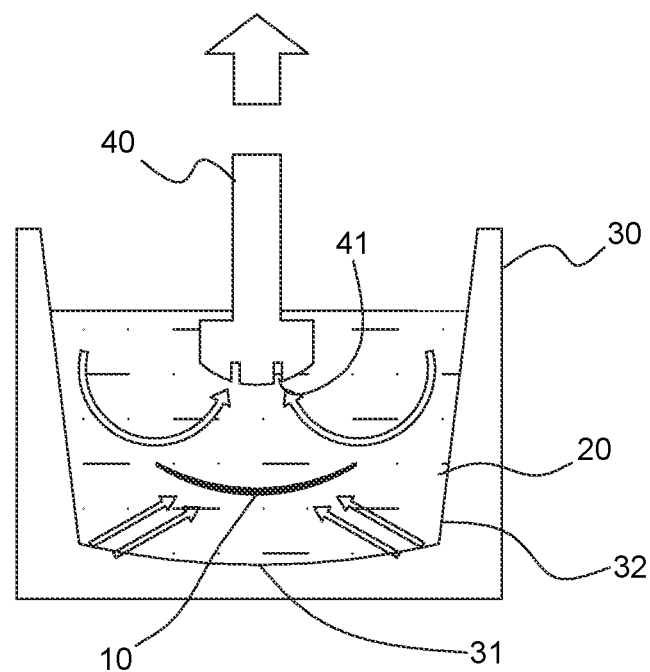

Next, in a step S20, the vacuum sucker 40 leaves the bottom of the detection container 30 at a second speed but still stays in the buffer solution 20. In other words, the vacuum sucker 40 does not break through the surface of the buffer solution 20, as shown in FIG. 2C. The abovementioned process induces the buffer solution 20 to flow and makes the contact lens 10 move toward the center of the detection container 30.

Figure 2D:
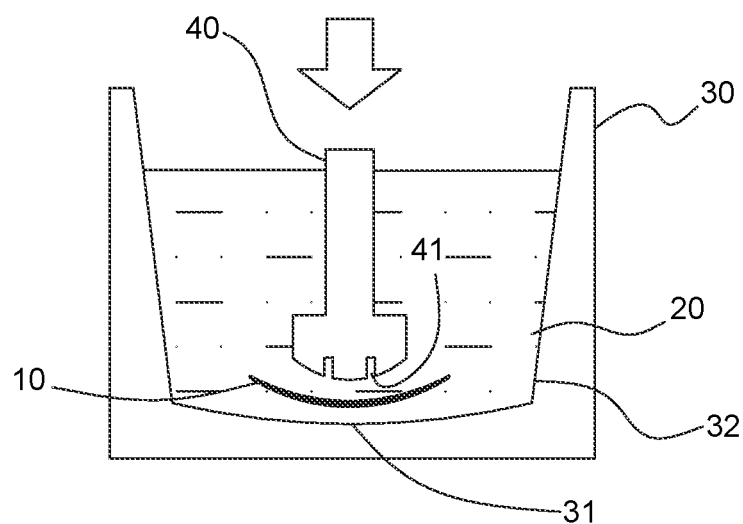

Next, in a step S30, the vacuum sucker 40 is moved at a third speed toward the bottom of the detection container 30 to approach the contact lens 10 and finally touch the contact lens 10 at an appropriate position, whereby the positioning of the vacuum sucker 40 and the contact lens 10 is done, as shown in FIG. 2D.

Figure 2E:
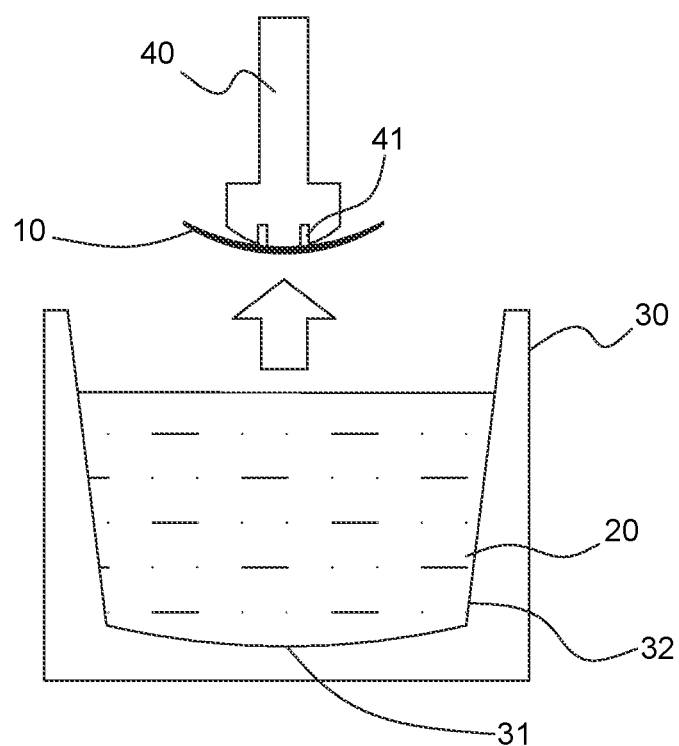

Next, in a step S40, the vacuum sucker 40 is started to use a vacuum suction force to suck the contact lens 10, and then the vacuum sucker 40 carries the contact lens 10 away from the detection container 30, as shown in FIG. 2E. Thus, the retrieving process is completed.

In the method of the present invention, the first speed is preferably smaller than the second speed; the third speed is preferably smaller than the first speed. In other words, the second speed>the first speed>the third speed.

It is further explained: the reason why the contact lens 10 is moved to slightly depart from the lateral surface 32 is to enhance the effect of the step S20. If the contact lens 10 still stays at the lateral lower portion of the detection container 30, the buffer solution 20 will not flow to the center of the bottom of the detection container 30 in the step S20. Thus, the step S20 will not achieve the desired effect. In other words, the contact lens 10 is hard to be centered.

In the step S20, the process that the vacuum sucker 40 runs away from the buffer solution 20 fast may generate a stronger flows of the buffer solution 20 to make the contact lens 10 more likely to move toward the center of the detection container 30 if the vacuum sucker 40 does not completely depart from the buffer solution 20. If the vacuum sucker 40 completely depart from the buffer solution 20, too large a surface turbulence may affect the flowing of the contact lens 10.

In the step S30, the vacuum sucker 40 moves toward the contact lens 10 once again at a lower speed and restricts the movement of the contact lens 10. However, the vacuum sucker 40 should not squeeze the contact lens 10 lest the contact lens 10 be damaged.

The detection container 30 of the present invention is normally made of a transparent material. The inner bottom surface 31 of the detection container 30 is preferably an arc-shaped surface, and the inner lateral surface 32 of the detection container 30 is preferably an oblique surface, whereby the contact lens 10 is more likely to move toward the center of the detection container 30 while the contact lens 10 comes to the underneath of the buffer solution 20.

In one embodiment, the front end of the vacuum sucker 40 is fabricated to have an arc-shaped surface, which matches the curvature radius of the contact lens 10, whereby to increase the sucking force of the vacuum sucker 40 to the contact lens 10 and make the contact lens 10 securely attached to the vacuum sucker 40. The conventional planar vacuum sucker and too large a sucking hole may cause the distortion of the contact lens. In one embodiment, the arc-shaped surface of the front end of the vacuum sucker 40 has a plurality of sucking holes 41 to prevent the distortion of the contact lens 10 during the transfer process.

Figure 3A:
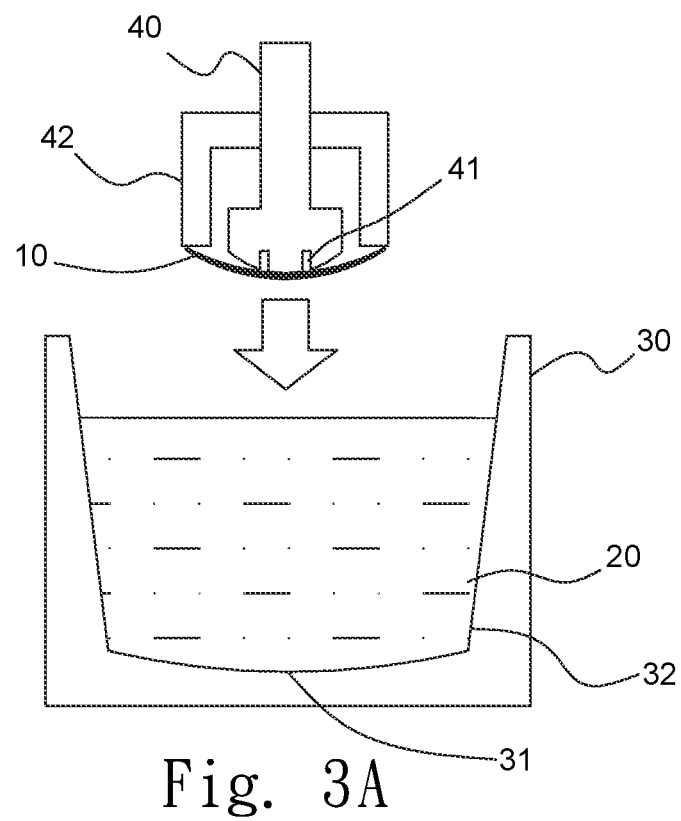
FIG. 3A and FIG. 3B are diagrams schematically showing the structure and operation of a first embodiment of the vacuum sucker of the present invention.
Figure 3B:
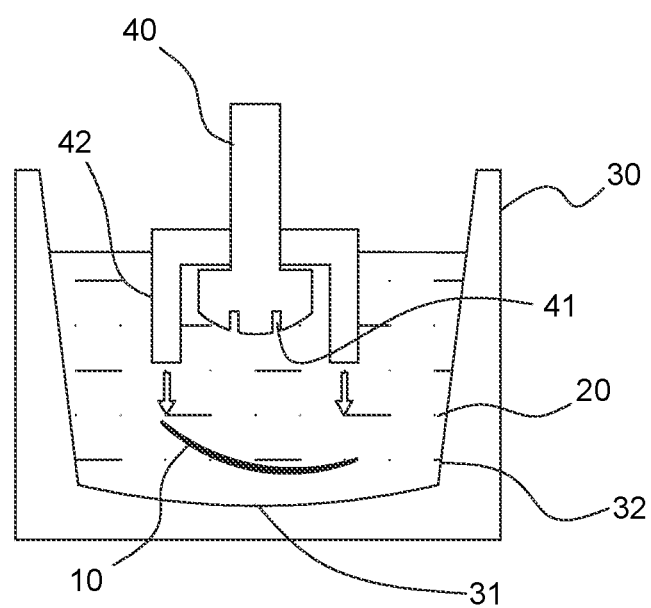

Refer to FIG. 3A and FIG. 3B, which schematically show the structure and operation of a first embodiment of the vacuum sucker 40 of the present invention. In this embodiment, the vacuum sucker 40 includes a pusher 42. The pusher 42 is disposed along the perimeter of the vacuum sucker 40 and able to move back and forth with respect to the vacuum sucker 40. The user may apply force to make the pusher 42 move along the direction of the applied force. For example, while the vacuum sucker 40 is sucking the contact lens 10, a force, which is toward the front end of the vacuum sucker 40, is applied to the pusher 42 to make the pusher 42 move toward the front end of the vacuum sucker 40 and protrude from the vacuum sucker 40, whereby the contact lens 40 attached to the vacuum sucker 40 is separated from the vacuum sucker 40. Thus, the contact lens 10 is unloaded from the vacuum sucker 40. In addition to being used after the optical detection, the pusher 42 may also be used in the positioning process before the optical detection. Refer to FIG. 3B. The vacuum sucker 40, which the contact lens 10 is attached to, is immersed into the buffer solution 20, and then the pusher 42 is pushed out to make the contact lens 10 drop into the buffer solution 20, whereby to prevent the contact lens 10 from drifting down randomly while the vacuum sucker 40 intends to terminate the conveying process and decrease the sucking force.

Figure 4A:
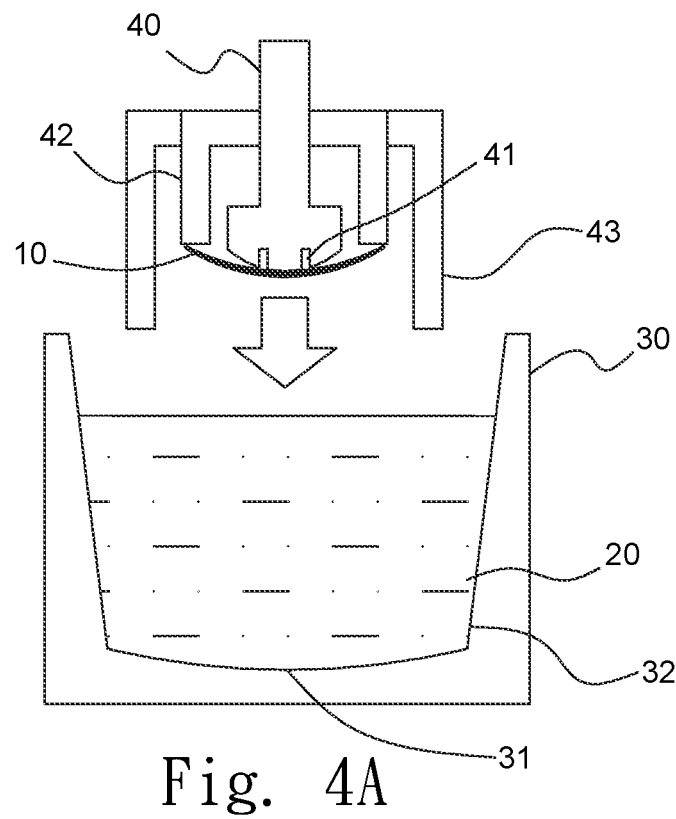
FIG. 4A and FIG. 4B are diagrams schematically showing the structure and operation of a second embodiment of the vacuum sucker of the present invention.
Figure 4B:
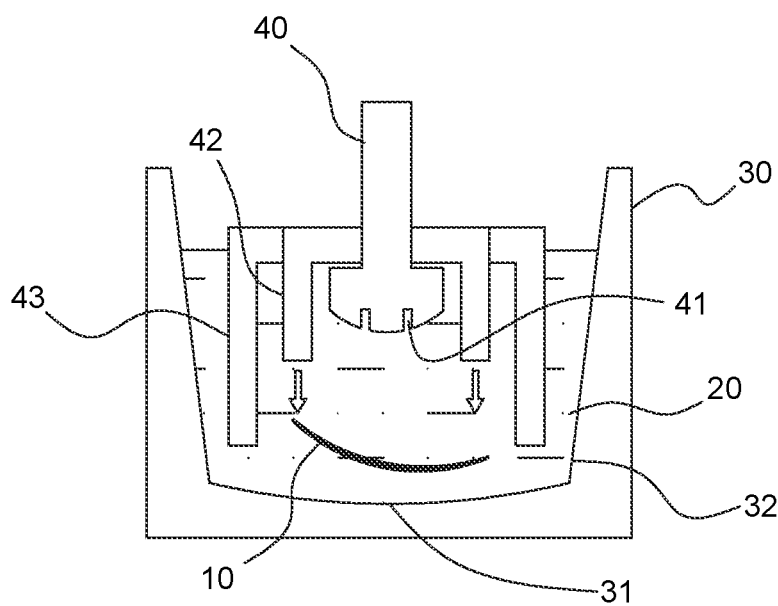

Refer to FIG. 4A and FIG. 4B, which schematically show the structure and operation of a second embodiment of the vacuum sucker 40 of the present invention. The second embodiment is different from the first embodiment in that the vacuum sucker 40 further includes a limiting device 43 in the second embodiment. The limiting device 43 is disposed along the perimeter of the pusher 42 and protrudes from the front end of the pusher 42. The limiting device 43 is able to move together with the pusher 42. As shown in FIG. 4B, while the vacuum sucker 40 is in the buffer solution 20 and the pusher 42 is pushed out to unload the contact lens 10, the limiting device 43 is also pushed out together with the pusher 42 to restrict the movement of the contact lens 10. Thus, the limiting device 43 can limit the allowable movement range of the contact lens 10 and make the centering operation of the contact lens 10 easier.

In the abovementioned embodiments, the pusher 42 and the limiting device 43 may be in form of continuous annular walls. Alternatively, the pusher 42 and the limiting device 43 may be in form of discontinuous annular walls. For example, each of the pusher 42 and the limiting device 43 may be but are not limited to be in form of a plurality of plates or pillars. Thereby are decreased the contact areas of the buffer solution 20 and the pusher 42 and the limiting device 43 lest too large an area enter the buffer solution 20 and cause the buffer solution 30 to generate too large a fluctuation.

In conclusion, the present invention proposes a contact lens retrieving method characterized in sequentially controlling the flowing of the buffer solution to favor the positioning of the contact lens in the detection container and make the contact lens be retrieved easily. Distinct from the conventional technology, the present invention is exempted from manually adjusting and positioning the contact lens.

Therefore, the present invention can effectively save manpower. Further, the present invention can decrease bubbles generated in the buffer solution. Hence, the present invention can increase the efficiency of retrieving contact lenses, shorten the time of detecting contact lenses, and reduce the cost of detecting contact lenses.

The embodiments described above are only to exemplify the present invention but not to limit the scope of the present invention. The equivalent modification or variation according to the spirit or characteristic of the present invention is to be also included by the scope of the present invention.

What is claimed is:

1. A contact lens retrieving method, wherein a contact lens is placed in a detection container containing a buffer solution, comprising steps:
   moving a vacuum sucker into the buffer solution at a first speed to make the contact lens depart from a lateral side of the detection container;
   moving the vacuum sucker away from a bottom of the detection container at a second speed with the vacuum sucker not leaving the buffer solution to make the contact lens flow toward a center of the detection container;
   moving the vacuum sucker to approach the contact lens at a third speed to make the vacuum sucker and the contact lens positioned to each other; and
   using the vacuum sucker to take up the contact lens and carry the contact lens out of the detection container.

2. The contact lens retrieving method according to claim 1, wherein the first speed is smaller than the second speed.

3. The contact lens retrieving method according to claim 1, wherein the third speed is smaller than the first speed.

4. The contact lens retrieving method according to claim 1, wherein the vacuum sucker includes a pusher; the pusher is disposed along a perimeter of the vacuum sucker and moved back and forth with respect to the vacuum sucker.

5. The contact lens retrieving method according to claim 4, wherein the vacuum sucker further includes a limiting device; the limiting device is disposed along a perimeter of the pusher and protrudes to a front end of the pusher.

6. The contact lens retrieving method according to claim 1, wherein the detection container has an arc-shaped inner bottom surface.

7. The contact lens retrieving method according to claim 1, wherein the detection container has an oblique inner lateral surface.

8. The contact lens retrieving method according to claim 1, wherein a front end of the vacuum sucker has an arc-shaped surface, and the arc-shaped surface has a plurality of air-sucking holes.

\* \* \* \* \*